United States Patent
Khushu et al.

(10) Patent No.: US 8,224,283 B2
(45) Date of Patent: Jul. 17, 2012

(54) FM BAND AVAILABILITY BASED ON GPS

(75) Inventors: Sanjeev Khushu, San Diego, CA (US); Cormac S. Conroy, Campbell, CA (US); Leonid S. Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 959 days.

(21) Appl. No.: 12/139,436

(22) Filed: Jun. 13, 2008

(65) Prior Publication Data

US 2009/0311984 A1    Dec. 17, 2009

(51) Int. Cl.
*H05K 11/00*    (2006.01)
(52) U.S. Cl. ..................... 455/344; 455/3.06
(58) Field of Classification Search ............... 455/3.06, 455/344, 345, 150.1, 161.1, 161.2
See application file for complete search history.

(56) References Cited

U.S. PATENT DOCUMENTS

| | | | |
|---|---|---|---|
| 5,471,662 A * | 11/1995 | Shiota | 455/166.1 |
| 7,512,380 B2 | 3/2009 | McGowan | |
| 2003/0036357 A1 * | 2/2003 | McGowan | 455/62 |
| 2004/0143388 A1 * | 7/2004 | Yano et al. | 701/209 |
| 2008/0077323 A1 | 3/2008 | Boysen | |

FOREIGN PATENT DOCUMENTS

WO    WO2008062249    5/2008

OTHER PUBLICATIONS

International Search Report and the Written Opinion—PCT/US2009/046882, International Search Authority—European Patent Office—Jan. 27, 2010.

* cited by examiner

*Primary Examiner* — Lewis West
(74) *Attorney, Agent, or Firm* — Thien T. Nguyen

(57) ABSTRACT

Methods and apparatus for determining an available FM frequency channel for interfacing with FM modulated output signals from a wireless device are described herein. A SPS receiver, such as a GPS receiver, can determine its position based on conventional techniques. The SPS receiver can determine one or more available FM channels over which audio output may be transmitted. The SPS receiver can use the determined position to access a local data base of available channels. Alternatively, the SPS receiver can use the determined position to access a local database of allocated channels in order to determine one or more available channels. The SPS receiver may display a prompt or message that indicates an FM channel over which output audio is modulated.

30 Claims, 3 Drawing Sheets

US 8,224,283 B2

FM BAND AVAILABILITY BASED ON GPS

BACKGROUND

I. Field of the Invention

The invention relates to wireless communications. More particularly, the invention relates to interfacing a wireless signal with an FM receiver.

II. Description of Related Art

Electronic equipment may include numerous output capabilities from which a user may select. For example, electronic equipment may provide visual output via a display, audio output via a speaker, wireless output, or some combination thereof. The electronic equipment may provide wireless output by modulating the visual output onto a television carrier or modulating audio output onto a radio carrier, such as a Frequency Modulation (FM) radio carrier.

Typically, the electronic equipment does not monitor the output RF band, but relies on a user to select the desired output band from a set of fixed choices. For example, electronic equipment may permit RF video output on one of NTSC television channels 3 or 4. A user can configure the electronic device for the desired television, and can tune a local television to the corresponding channel to receive the modulated video signal.

Similarly, the electronic equipment may permit RF audio output on one or two predetermined FM channels. The user can select the desired FM channel and the electronic equipment can modulate the audio signal onto the carrier of the selected FM channel. The user can tune a local radio receiver to the corresponding frequency to receive the modulated audio.

However, existing broadcasters may already be using the desired output band. In the case of NTSC video, existing local broadcasters may already be broadcasting on either or both of channels 2 and 3. Similarly, existing local FM radio broadcasters may already be broadcasting on the fixed selection of radio output frequencies. Existing broadcasters appear to the electronic equipment as interference sources, and their presence may significantly degrade the signal quality from the electronic device. The user may not have the ability to successfully configure an RF modulated output signal from the electronic device in situations where the existing broadcasters occupy the spectrum for all of the fixed RF output selections.

Incorporating RF output capabilities in a portable electronic device poses additional issues. The mobility of a portable electronic device further complicates the operating environment and increases the probability that a broadcaster will transmit interfering signals over the selected RF output frequency. The portable electronic device may initially be outside of a broadcast area but may move into a broadcast area. Thus, a selected RF output frequency may initially provide a sufficient signal quality, but the signal quality may degrade to unacceptable levels as the portable electronic device moves into an area having a broadcaster on the selected RF output frequency.

BRIEF SUMMARY

Methods and apparatus for determining an available FM frequency channel for interfacing with FM modulated output signals from a wireless device are described herein. A SPS receiver, such as a GPS receiver, can determine its position based on conventional techniques. The SPS receiver can determine one or more available FM channels over which audio output may be transmitted. The SPS receiver can use the determined position to access a local data base of available channels. Alternatively, the SPS receiver can use the determined position to access a local database of allocated channels in order to determine one or more available channels. The SPS receiver may display a prompt or message that indicates an FM channel over which output audio is modulated.

Aspects of the invention include a method of determining an output frequency. The method includes determining a geographic location of a mobile receiver, accessing a database to determine at least one candidate frequency based on the geographic location, and providing information modulated on a desired frequency selected from the at least one candidate frequency.

Aspects of the invention include a method of determining an output frequency. The method includes receiving information relating to a geographic destination, determining a geographic location of a personal navigation device based at least in part on received Global Positioning System (GPS) satellite vehicle signals, determining a route from the geographic location to the geographic destination, determining at least one candidate radio frequency based on the geographic location, receiving a user selection of an output RF frequency based on the at least one candidate radio frequency, generating an audio signal based on the geographic location and the route, frequency modulating the audio signal onto the output RF frequency to generate a frequency modulated output RF frequency, and outputting the frequency modulated output RF frequency.

Aspects of the invention include an apparatus configured to automatically determine at least one available output RF frequency. The apparatus includes a satellite positioning receiver configured to receive a plurality of satellite positioning signals and determine a geographic location of the apparatus, a broadcast database configured to store information relating output frequencies to geographic areas, a processor configured to access the broadcast database and determine at least one candidate frequency based on the geographic location, a modulator configured to modulate an information signal onto an output frequency selected from the at least one candidate frequency to generate a modulated output frequency; and a transmitter configured to transmit the modulated output frequency.

Aspects of the invention include an apparatus configured to automatically determine at least one available output RF frequency. The apparatus includes means for receiving information relating to a geographic destination, means for determining a geographic location of a personal navigation device based at least in part on received Global Positioning System (GPS) satellite vehicle signals, means for determining a route from the geographic location to the geographic destination, means for determining at least one candidate radio frequency based on the geographic location, means for receiving a user selection of an output RF frequency based on the at least one candidate radio frequency, means for generating an audio signal based on the geographic location and the route, means for frequency modulating the audio signal onto the output RF frequency to generate a frequency modulated output RF frequency, and means for outputting the frequency modulated output RF frequency.

Aspects of the invention include a computer readable medium encoded with computer executable instructions for receiving information relating to a geographic destination, determining a geographic location of a personal navigation device based at least in part on received Global Positioning System (GPS) satellite vehicle signals, determining a route from the geographic location to the geographic destination, determining at least one candidate radio frequency based on the geographic location, receiving a user selection of an output RF frequency based on the at least one candidate radio frequency, generating an audio signal based on the geographic location and the route, controlling a modulator to frequency modulate the audio signal onto the output RF frequency to generate a frequency modulated output RF frequency, and controlling a transmitter configured to output the frequency modulated output RF frequency.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Personal navigation devices are by nature portable devices that can be expected to traverse wide geographic locations during use. A portable navigation device may support an option to output audio from the device via an FM transmitter to an FM receiver. The FM receiver can be, for example, an FM car stereo. The user may use audio output from the personal navigation device, for example, to provide navigation assistance during travel.

For the audio output to play on the FM stereo, the user tunes the FM stereo to one or more different frequencies that are supported by the personal navigation device and determines which frequency band or channel is available. Once that determination is done, the user sets the FM transmitter frequency on the personal navigation device to the desired frequency.

One problem with the above approach is that the frequency selection is manual and is prone to errors. A user may erroneously select as the desired frequency, a frequency that does not provide the signal quality that would have been available had the user selected another frequency. Also, as noted above, the audio output may degrade while the user is driving or otherwise traveling from one geographical location to another location because the FM frequency assignment (including free and occupied frequencies) can change from one location to another.

To alleviate some of the problems associated with establishing and maintaining an RF output link in the FM band, the personal navigation device can be configured to determine its location using the position location techniques enabled in the navigation device and determine one or more candidate FM frequencies. The one or more candidate frequencies may be determine based in part on the location and can be based in part on a database of allocated or free FM bands associated with the location.

The personal navigation device automatically determines the one or more available FM bands that may be selected to output audio. The automated output band detection feature eliminates the need for a user to scan the available frequency bands. Using an FM database and location information, the personal navigation device can keep track of its current location and the available bands corresponding to that location. The personal navigation device can be configured to update the location and can utilize the updated location to determine when a better FM frequency is available. The personal navigation device can prompt the user to tune the FM receiver frequency to the new band. The user can be prompted via display and/or an audio alert on the device or through the FM radio.

Figure 1:
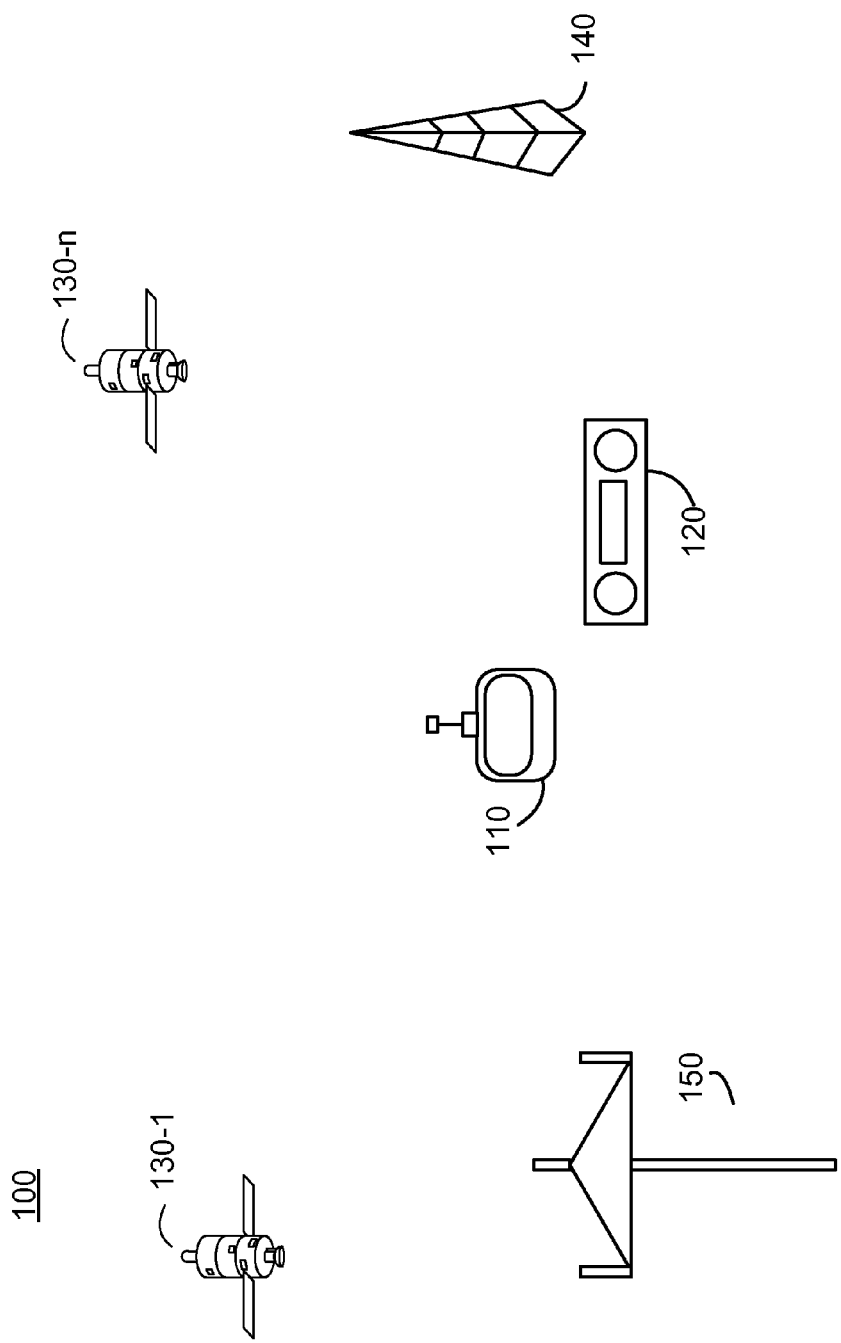
FIG. 1 is a simplified functional block diagram of an SPS receiver environment.

FIG. 1 is a simplified functional block diagram of a receiver environment 100. The receiver environment 100 illustrates a satellite positioning system (SPS) receiver 110 having RF output capabilities. The SPS receiver 110 can be configured to determine its geographic location based on signals received from a plurality of satellite vehicles 130-1 through 130-n. Only two satellite vehicles 130-1 and 130-n are shown in FIG. 1, although the SPS receiver 110 typically requires signals from four satellite vehicles in order to make an unambiguous position fix.

The SPS receiver 110 can be, for example, a Global Positioning System (GPS) receiver or can be configured to utilize satellite positioning signals from some other type of satellite positioning system, including, but not limited to, GLONASS, Galileo, and the like. Additionally, the SPS receiver 110 is not limited to determining a position fix exclusively based on satellite signals, but may also utilize positioning signals from one or more terrestrial beacons 150. The terrestrial beacon 150 can be, for example, a differential GPS beacon, a pseudolite, a wireless telephone base station, and the like.

The SPS receiver 110 can be configured to transmit an RF output signal that is modulated with output information. For example, the RF output signal can be modulated with display information, audio information, positioning data, and the like, or some combination thereof. The SPS receiver 110 can be configured to generate the RF output signal using a modulation scheme and carrier frequency supported by a common communication standard. The RF output from the SPS receiver 110 can be within a licensed wireless communications band, where the majority of broadcasters are licensed or otherwise known, and where emissions from unlicensed transmitter is unlikely top interfere with the modulated RF output.

For example, the SPS receiver 110 can be configured to FM modulate an audio output signal onto a carrier within a licensed FM radio band of 88 MHz-108 MHz. In another embodiment, the SPS receiver 110 can be configured to modulate video display information onto a video carrier. For example, the SPS receiver 110 can be configured to Vestigial Sideband modulate the display information as a video signal on an NTSC television carrier frequency.

The modulated RF output signal from the SPS receiver 110 can be received by a wireless receiver 120 for processing and output. For example, FM modulated audio signals can be received by an FM receiver, which can be a car stereo or portable radio.

A wireless output link can be particularly advantageous in a situation where the SPS receiver 110 is configured as a personal navigation device and is configured to assist the user in navigating the user to a destination. In one example, the SPS receiver 110 can be configured to output turn-by-turn driving directions based on a predetermined destination input by the user. The user can configure the SPS receiver 110 to output the audio within the FM band, and can tune the FM receiver in the car to receive the modulated audio output. The audio output from the SPS receiver 110 can be recovered by the FM receiver and can then be output from the car audio system.

The SPS receiver 110 can be configured to autonomously determine the available bands in the licensed band instead of preconfiguring the SPS receiver 110 with a fixed selection of carriers within the licensed band or having the user search for an available band and programming the selected band into the SPS receiver 110. In an example of an FM radio band as the licensed band, the SPS receiver 110 can determine a set of one or more available FM bands based at least in part on a geographic location of the SPS receiver 110 and a database of available or allocated frequencies associated with the geographic location. The SPS receiver 110 can display the set of available output frequency bands, and can be configured to display the set of available output frequency bands in a ranked order. The user can select one of the available output frequencies from the set of available output frequencies, and the SPS receiver 110 can configure the RF output for the selected frequency. The user can tune the wireless receiver 120 to the same frequency as the selected frequency in order to receive the output signal.

Figure 2:
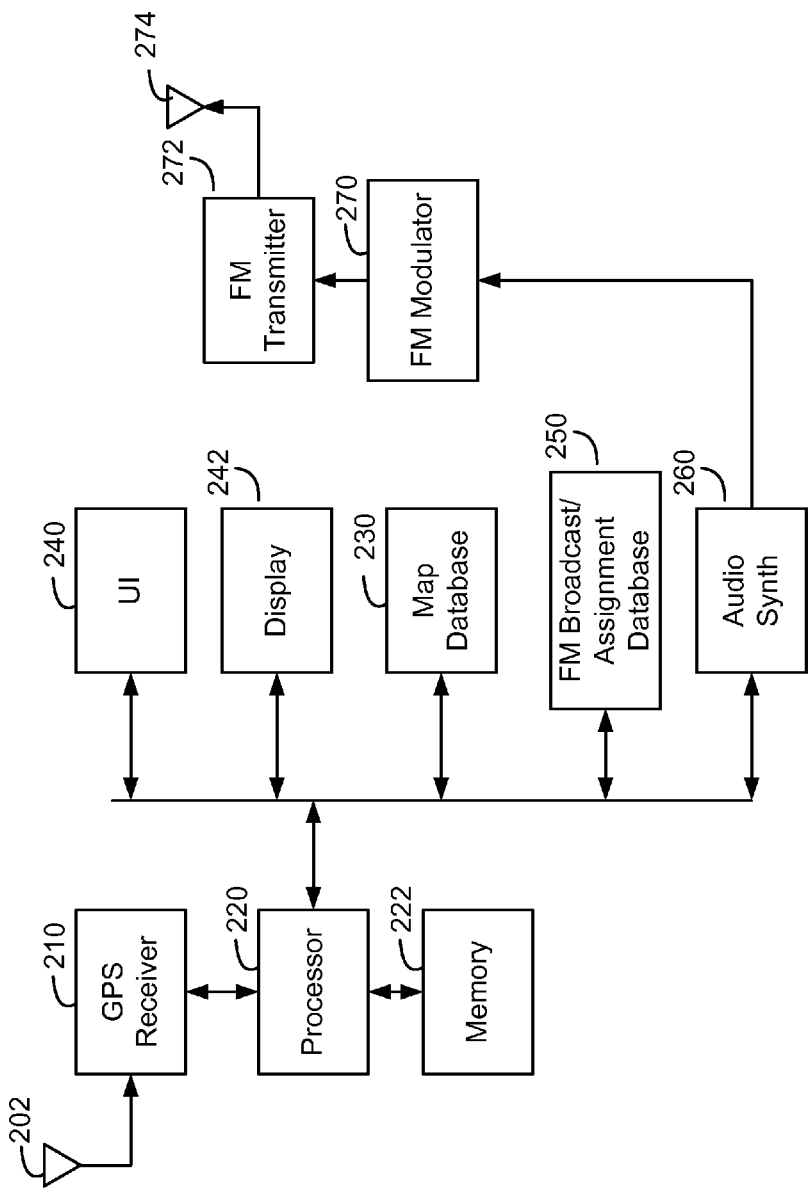
FIG. 2 is a simplified functional block diagram of an embodiment of a SPS receiver supporting RF modulated output.

FIG. 2 is a simplified functional block diagram of an embodiment of a SPS receiver 110 supporting RF modulated output. Although the SPS receiver 110 is described in the context of a GPS receiver, the SPS receiver 110 is not limited to processing GPS signals.

The SPS receiver 110 can be, for example, the SPS receiver shown in the receiver environment of FIG. 1. The SPS receiver 110 can be configured to automatically determine one or more available output RF frequencies based at least in part on the geographic location of the SPS receiver 110.

The SPS receiver 110 includes an SPS antenna 202 coupled to a GPS receiver 210 that is configured to operate in conjunction with a processor 220 coupled to memory 222. The GPS receiver 210 can be configured to receive a plurality of GPS satellite vehicle signals and determine a position fix or geographic location of the SPS receiver 110. Typically, the GPS receiver 210 requires signals from four satellite vehicles in order to make an unambiguous position fix. The manner in which the GPS receiver can determine a position fix is well known. Generally, the GPS receiver 210 receives PN encoded signals from each of the satellite vehicles and determines a pseudo range to each satellite based on an almanac of satellite position information as corrected by ephemeris data. Pseudoranges to three distinct satellite vehicles are typically sufficient to make a three dimensional position fix, whose accuracy is affected by a timing or clock uncertainty. A pseudorange to a fourth satellite vehicle can be used to resolve or otherwise refine the clock uncertainty.

The SPS receiver 110 can be configured as a personal navigation device that enables, for example, guided driving directions to a user input destination. The SPS receiver 110 can include a user interface 240 that is configured to accept user input. The user interface 240 can include buttons, keypads, a scroll wheel, a touchpad, a voice recognition module, an electrical port, and the like or some combination thereof. In some embodiments, the user interface 240 is integrated with an output device, such as a display 242.

The display 242 can be configured to output a graphical representation of the guided directions or a map of an area, and can be configured to output other user information, such as instructions, prompts, or menus. In some implementations, the display 242 can be a touch screen and can also serve as part of the user interface 240.

The SPS receiver 110 can also include a map database 230 that can be configured, for example, as map information stored in one or more storage devices. The user can update the map database 230, for example, by downloading updated database information through an electronic port that is part of the user interface 240.

The processor 220 can receive the user destination provided via the user interface 240, determine the geographic location of the SPS receiver 110 from the GPS receiver 210, and can access the map database 230 in order to determine a route from the present geographic location to the user destination. The processor 220 can update the route based on position updates from the GPS receiver 210.

The processor 220 can output the map and route information on the display 242 to provide the user with a visual guide to the destination. Additionally, the SPS receiver 260 can include an audio synthesizer 260 that can be configured to provide audio output, such as synthesized voice output. The audio output from the audio synthesizer 260 can include audio navigation information that augments the visual information output on the display 242.

The SPS receiver 110 can also include a frequency programmable FM modulator 270 that is coupled to the audio synthesizer 260 and configured to receive the audio output. The frequency programmable FM modulator 270 can be programmed to operate within the licensed FM band of 88 MHz-108 MHz. In one embodiment, the frequency programmable FM modulator 270 can be programmed to any operating frequency within the FM band. The carrier frequency of the frequency programmable FM modulator 270 can be configured to have a programmable resolution of 100 kHz, to align with the frequency spacing in the FM band.

The frequency programmable FM modulator 270 modulates the audio output onto the programmed carrier frequency and outputs the modulated carrier frequency to an FM transmitter 272. The FM transmitter 272 amplifies the signal and transmits the signal in conjunction with an RF antenna 274. Alternatively, the FM transmitter 272 can couple the signal to a wired antenna port that can couple the signal to an antenna input of a user audio device, such as a car stereo. Ideally, the programmable FM modulator 270 is programmed to operate at a carrier frequency that is substantially devoid of interfering signals, such as from licensed broadcasters on the programmed carrier, broadcasters on adjacent channels, or other interference sources.

The SPS receiver 110 includes intelligent assistance to facilitate a user selection of a low interference RF carrier over which the audio output is modulated. The SPS receiver 110 can include an FM broadcast database 250. The FM broadcast database can include the frequency allocations of all licensed broadcasters within the FM band and can relate the licensed broadcasters to a geographic area. The FM broadcast database can be initially loaded by the manufacturer, and may be updated by downloading updated databases in a manner similar to the updating of the map database. The SPS receiver 110 can utilize the current geographic location provided by the GPS receiver 210 to determine a list of one or more candidate frequencies.

In one embodiment, the SPS receiver 110 compares the most recent geographic location determined by the GPS receiver 210 to the listing of licensed broadcasters within a coverage area encompassing the location. The SPS receiver 110 can select the RF carriers for which no broadcaster is allocated in the geographic area.

The SPS receiver 110 can further limit or rank the RF carriers based on one or more parameters or filtering criteria. The filtering criteria can include, for example, a spectral proximity of an RF carrier to a licensed broadcaster, a physical proximity of a licensed broadcaster's transmitter location to the geographic location from the GPS receiver 210, a predetermined frequency preference, for example, a preference towards lower band frequencies or upper band frequencies, and the like or some combination thereof The SPS receiver 110 can also utilize the user input destination or one or more points along the destination as further filtering criteria. That is, the SPS receiver 110 can determine, for one or more points along the prospective route to the user destination, whether to eliminate or otherwise reduce the desirability of the selected list of RF carriers.

The SPS receiver 110 can be configured to select a predetermined number of candidate frequencies for display to the user. For example, the SPS receiver 110 may select the two frequencies having the highest rank following application of the filtering criteria. The SPS receiver 110 can, for example, display the candidate frequencies along with a prompt for a user selection.

The SPS receiver 110 can accept the user selection via the user interface 240. The SPS receiver 110 programs the frequency of the FM modulator 270 to the selected frequency.

In an alternative embodiment, the FM broadcast database 250 can be configured to store a list of available frequencies and their associated availability areas. The SPS receiver 110 can determine its geographic location from the GPS receiver 210 and can access the FM broadcast database 250 to determine a list of available RF frequencies encompassing the geographic area. The SPS receiver 110 can similarly rank or filter the results using criteria that is the same or similar to the criteria described in the earlier embodiment. The SPS receiver 110 can display the ranked results and accept a user selection as in the previous embodiment.

In some instances, the selected frequency may not support a satisfactory audio signal quality for an entire route from a present location to a user destination. A degradation in signal quality can occur, for example, due to the SPS receiver 110 moving into an area having a licensed broadcaster on the selected FM frequency. The inability for a single frequency to support an entire route may be due to any number of reasons. For example, the traveled route may traverse significant distances, making it impossible to select a single unassigned frequency for the entire route. The user may stray from an originally planned route. The SPS receiver 110 may not take into account the proposed route in determining frequencies, or the user may select a frequency that is not available for the entire route.

Regardless of the reasons, there may be occasions in which the presently active FM carrier is unable to support a high audio signal quality. In such instances, the SPS receiver 110 can redetermine the list of candidate frequencies and prompt the user to make an updated selection.

In one embodiment, the SPS receiver 110 can receive user input requesting that the list of candidate frequencies be updated. In another embodiment, the SPS receiver 110 can be configured to automatically update the list of available frequencies based on automated parameters. For example the SPS receiver 110 can update the list of available frequencies every time the GPS receiver 210 provides an updated geographic location or based on a factor determined from the updated geographic location. Alternatively, the SPS receiver 110 may update the list of available frequencies when the change in geographic location exceeds some predetermined threshold. In general, the SPS receiver 110 can update the list of available frequencies based on passage of time, occurrence of an event, or some combination thereof.

The SPS receiver 110 need not prompt the user to make an updated carrier frequency selection each time the list of candidate frequencies fails to include the currently active frequency selection. Instead, the SPS receiver 110 may impliedly determine that the presently active frequency selection provides a degraded signal quality over the audio signal quality that could be supported by a different carrier frequency. The SPS receiver 110 can use any number of factors in determining whether to display the updated list of candidate frequencies and prompt the user for an updated selection. For example, the SPS receiver 110 may not display updated candidate frequencies unless it determines that the present active frequency selection is allocated to a broadcaster within the region encompassing the geographic location of the SPS receiver 110. Alternatively, the SPS receiver 110 may display updated candidate frequencies when the ranking of the present active frequency falls below the rankings of the candidate frequencies by some predetermined amount. The SPS receiver 110 may use other factors or combination of factors in determining whether to display the updated candidate frequencies and prompt the user for an updated selection.

The SPS receiver 110 is able to provide intelligent assistance to the user in selecting and updating the carrier frequency for audio output. The user is freed from the cumbersome routine of manually searching the FM band for a suitable output frequency and programming the frequency into the SPS receiver 110. The user is also freed from the restrictive implementation of having limited, one or two, fixed, output frequency choices.

Figure 3:
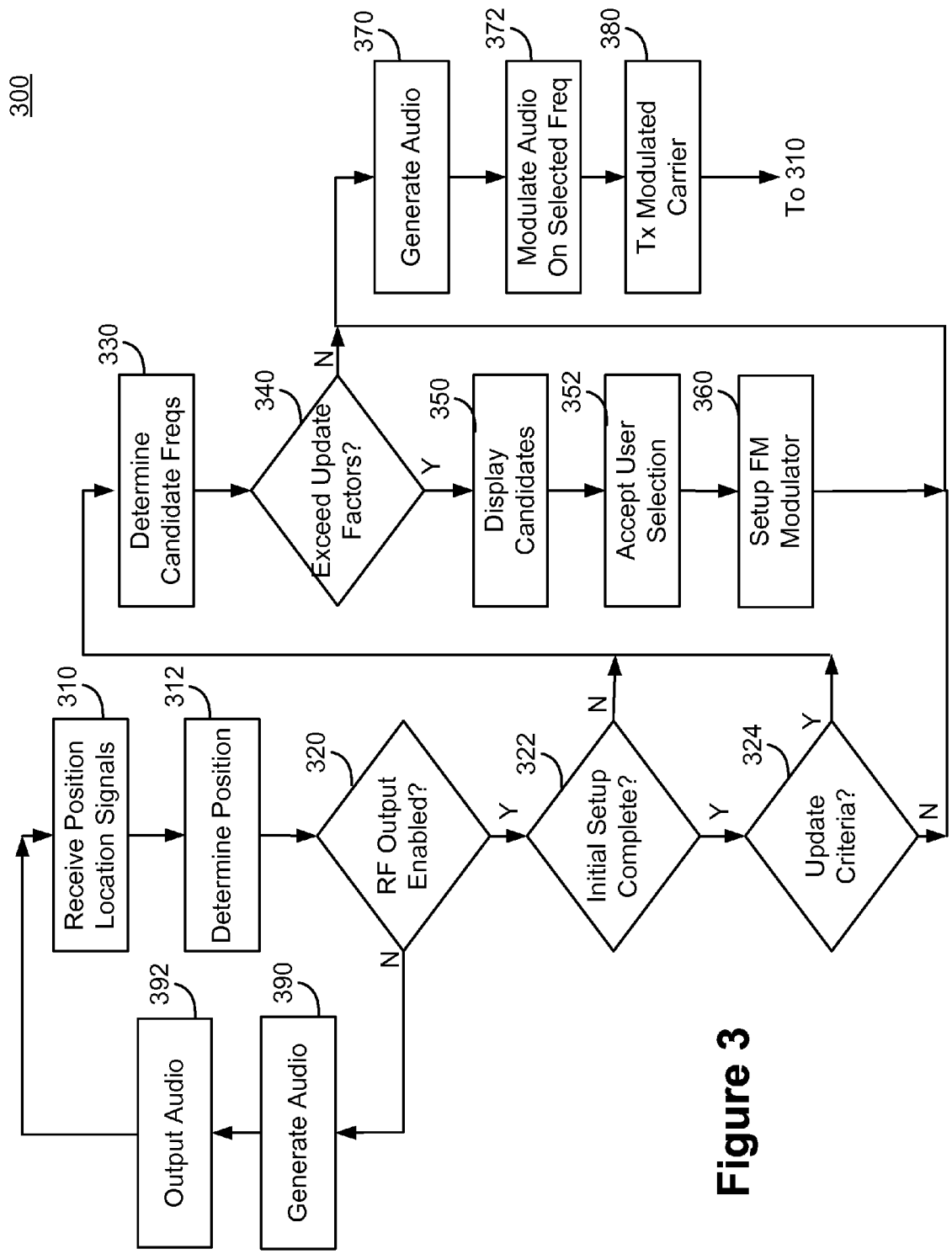
FIG. 3 is a simplified functional flowchart of an embodiment of automatically determining FM channel availability based on position.

FIG. 3 is a simplified functional flowchart of an embodiment of a method 300 of automatically determining FM channel availability based on position. The method 300 can be implemented, for example, in an SPS receiver such as a personal navigation device operating in the environment of FIG. 1. For example, the method can be embodied as computer or processor executable instructions encoded in computer or processor readable storage media, such as memory.

The method 300 is described in the context of position location using GPS and determining an RF link in the licensed FM band of 88 MHz-108 MHz. In general, the position determination is not limited to a GPS position fix, nor is the output RF link limited to the FM band.

The method 300 begins at block 310, where the personal navigation device receives GPS signals from a plurality of GPS satellite vehicles. The personal navigation device proceeds to block 312 and determines the geographic location of the personal navigation device based on the GPS signals.

The personal navigation device proceeds to decision block 320 and determines if RF output, such as audio output FM modulated on an RF carrier, is selected or otherwise enabled by the user. If not, the personal navigation device proceeds to block 390 where it generates the audio. The personal navigation device proceeds from block 390 to block 392 and outputs the audio, for example, using a speaker. The personal navigation device proceeds back to 310 to update the position fix.

If, at decision block 320 the personal navigation device determines that RF output is enabled, the personal navigation device proceeds to decision block 322. At decision block 322, the personal navigation device determines if initial setup of the RF frequency has previously been completed. If so, the personal navigation device proceeds to decision block 324 to determine if update of the candidate RF frequencies is desired. If, at decision block 322 the personal navigation device determines that initial setup has not yet been performed, the personal navigation device proceeds to block 330 to begin the process of identifying candidate frequencies. Similarly, if at decision block 324 the personal navigation device determines that the parameters for updating the candidate frequencies are met, the personal navigation device proceeds to block 330.

If, at decision block 324, the personal navigation device determines that the parameters for updating the candidate frequencies are not met, there is no need to perform the processing of candidate frequencies. The personal navigation device bypasses the candidate frequency processing and proceeds to block 370.

At block 330, the personal navigation device determines the list of candidate FM frequencies based at least in part on the geographic position of the personal navigation device. In one embodiment, the personal navigation device examines a database of allocated frequencies that identifies the frequencies of licensed FM band broadcasters and relates the broadcasters to a geographic area. The personal navigation device determines if the present geographic location of the personal navigation device, as determined by the GPS receiver, lies within the geographic area of the broadcasters. The personal navigation device can then determine which frequencies are unassigned or otherwise unlikely to have a broadcaster with sufficient signal strength to present significant interference. The personal navigation device can rank the list of candidate frequencies based on a number of criteria.

The personal navigation device proceeds to decision block 340 to determine if the factors for displaying the candidate frequencies are met. For example, the criteria for updating the list of candidate frequencies may include a change in geographic location greater than a predetermined threshold. However, even if the personal navigation device has traveled greater than a predetermined update distance, there may not be a need to update the active frequency used for the RF output. At decision block 340, the personal navigation device determines if the updated list of candidate frequencies is likely to be superior to the presently active RF frequency. The personal navigation device can determine that the updated list of candidate frequencies is likely to be superior to the presently active RF frequency, for example, if it determines that a licensed broadcaster is assigned to the presently active RF frequency and the licensed broadcaster is likely to contribute significant interference. Alternatively, the personal navigation device can determine that presently active RF frequency has degraded if the ranking of the presently active RF frequency is below some predetermined ranking threshold relative to the other frequencies in the candidate list.

If the personal navigation device determines that the updated list of candidate frequencies is unlikely to be superior to the presently active RF frequency, the personal navigation device proceeds to block 370 and omits prompting the user for an updated selection. However, if the personal navigation device determines that the updated list of candidate frequencies is likely to be superior to the presently active RF frequency, the personal navigation device proceeds to block 350 and displays the list of candidate frequencies or a predetermined number of candidate frequencies.

The personal navigation device proceeds to block 352 and accepts a user selection, for example, from a user interface such as a keypad or buttons. The user selection can include one of the displayed candidate frequencies or can be a reselection of the presently active RF frequency. The reselection of the presently active RF frequency can be express or implied. An implied reselection can be determined, for example, based on a timeout following display of the candidate frequencies.

The personal navigation device proceeds to block 360 and configures or otherwise sets the FM modulator for the selected frequency. In one embodiment, the personal navigation device tunes a frequency synthesizer to a frequency based on the selected frequency.

The personal navigation device proceeds to block 370 and generates the audio output. The personal navigation device proceeds to block 372 and modulates the audio onto the selected frequency. In one embodiment, the personal navigation device can frequency modulate the audio signal onto the selected frequency.

The personal navigation device proceeds to block 380 and wirelessly transmits the FM modulated signal, for example, by amplifying the modulated signal and coupling the signal to an antenna or an antenna port for transmission to a receiver. The personal navigation device proceeds back to block 310 to begin processing of the next position update.

Methods and apparatus are described herein for automated determination and prompting of an available RF output frequency within a band having interference sources that vary. A SPS receiver, such as a personal navigation device can determine one or more candidate frequencies within a predetermined operating band based at least in part on a geographic location of the receiver. The receiver can prompt the user to select one of the candidate frequencies for RF output. The SPS receiver can automatically update the list of candidate frequencies as the geographic location of the receiver changes.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of determining an output frequency, the method comprising:
    determining a geographic location of a mobile receiver;
    accessing a database to determine candidate frequencies based on the geographic location;
    ranking the candidate frequencies to a user;
    providing a list of available output frequencies based on the ranking of the candidate frequencies;
    providing information modulated on a desired frequency selected from the list of available output frequencies;
    monitoring signal quality on the desired frequency; and
    in response to the signal quality on the desired frequency falling below a predetermined threshold,
        determining an alternative set of candidate frequencies; and
        providing a list of alternative output frequencies based on the alternative set of candidate frequencies to the user.

2. The method of claim 1, further comprising:
    prompting the user for an output frequency based on the at least one candidate frequency; and
    receiving a user input corresponding to the desired frequency.

3. The method of claim 1 wherein providing the list of available output frequencies further comprises:
    displaying the list of available output frequencies based on the ranking.

4. The method of claim 3, wherein ranking the at least one candidate frequency comprises determining a spectral distance of each of the at least one candidate frequency to an allocated frequency.

5. The method of claim 3, wherein ranking the at least one candidate frequency comprises:
    determining a route to a geographic destination; and
    determining a ranking based on at least one additional geographic location selected from the route.

6. The method of claim 1, further comprising:
    determining an updated geographic location of the mobile receiver; and
    determining an updated list of candidate frequencies based on the updated geographic location.

7. The method of claim 1, wherein determining the geographic location of the mobile receiver comprises:
    receiving a plurality of satellite positioning system signals; and
    determining the geographic location based on the satellite positioning system signals.

8. The method of claim 7, wherein the satellite positioning system signals comprise Global Positioning System satellite vehicle signals.

9. The method of claim 1, wherein accessing the database comprises accessing a database relating FM band frequency allocations to geographic areas.

10. The method of claim 1, wherein accessing the database comprises accessing a database relating available FM band frequencies to geographic areas.

11. The method of claim 1, wherein providing information modulated on the desired frequency comprises:
    tuning an oscillator to the desired frequency; and
    frequency modulating an audio signal onto the desired frequency to generate a frequency modulated Radio Frequency (RF) signal.

12. The method of claim 11, further comprising coupling the frequency modulated RF signal to an antenna port.

13. A method of determining an output frequency, the method comprising:
    receiving information relating to a geographic destination;
    determining a geographic location of a personal navigation device based at least in part on received Global Positioning System (GPS) satellite vehicle signals;
    determining a route from the geographic location to the geographic destination;
    determining candidate radio frequencies based on the geographic location;
    ranking the candidate radio frequencies;
    providing a list of available output radio frequencies based on the ranking of the candidate frequencies to a user; and
    receiving a user selection of an output RF frequency based on the list of available output radio frequencies;
    generating an audio signal based on the geographic location and the route;
    frequency modulating the audio signal onto the output RF frequency to generate a frequency modulated output RF frequency;
    outputting the frequency modulated output RF frequency;
    monitoring signal quality on the output RF frequency; and
    in response to the signal quality on the output RF frequency falling below a predetermined threshold,
        determining an alternative set of candidate frequencies; and
        providing a list of alternative output frequencies based on the alternative set of candidate frequencies to the user.

14. The method of claim 13, further comprising:
    determining an updated geographic location of the personal navigation device; and
    determining an updated list of candidate frequencies based on the updated geographic location.

15. The method of claim 13, further comprising tuning a programmable frequency oscillator to the output RF frequency based on the user selection.

16. The method of claim 14, further comprising:
    determining whether update criteria is satisfied;
    displaying at least a portion of the updated list of candidate frequencies if the update criteria is satisfied; and
    prompting the user to select an updated output RF frequency.

17. The method of claim 13 wherein providing the list of available output frequencies further comprises:
    displaying the list of available output frequencies based on the ranking.

18. The method of claim 13, wherein determining at least one candidate radio frequency comprises determining at least one candidate frequency in a licensed FM radio band.

19. The method of claim 13, wherein generating the audio signal comprises generating audio navigation instructions.

20. The method of claim 13, wherein outputting the frequency modulated output RF frequency comprises coupling the frequency modulated output RF frequency to an antenna port.

21. An apparatus configured to automatically determine at least one available output RF frequency, the apparatus comprising:
    a satellite positioning receiver configured to receive a plurality of satellite positioning signals and determine a geographic location of the apparatus;
    a broadcast database configured to store information relating output frequencies to geographic areas;
    a processor configured to access the broadcast database and determine candidate frequencies based on the geographic location and to rank the candidate frequencies;

a display configured to display a list of available output frequencies based on the ranking of the candidate frequencies;
a modulator configured to modulate an information signal onto an output frequency selected from the list of available output frequencies to generate a modulated output frequency; and
a transmitter configured to transmit the modulated output frequency;
wherein the processor is configured to monitor signal quality on the selected output frequency; and wherein the processor is configured to determine an alternative set of candidate frequencies and provide a list of alternative output frequencies based on the alternative set of candidate frequencies to the user in response to the signal quality on the selected output frequency falling below a predetermined threshold.

22. The apparatus of claim 21, further comprising a user interface configured to receive a user destination and a user selection corresponding to the output frequency.

23. The apparatus of claim 22, further comprising a map database, and wherein the processor is further configured to determine a route based on the geographic location and the user destination.

24. The apparatus of claim 21, further comprising an audio synthesizer configured to generate audio information based on the geographic location, and wherein the modulator is configured to frequency modulate the audio information onto the output frequency.

25. The apparatus of claim 21, wherein the broadcast database is configured to store data relating broadcast assignments in a licensed FM band to geographic areas.

26. The apparatus of claim 21, wherein the broadcast database is configured to store data relating unassigned frequencies in a licensed FM band to geographic areas.

27. The apparatus of claim 21, wherein the modulator is configured to frequency modulate audio information onto the output frequency.

28. The apparatus of claim 21, wherein the satellite positioning receiver is configured to determine an updated geographic location and the processor is configured to access the broadcast database and determine at least one updated candidate frequency based on the updated geographic location, and
wherein the display is configured to prompt the user for an updated output frequency based on the at least one updated candidate frequency.

29. An apparatus configured to automatically determine at least one available output RF frequency, the apparatus comprising:
means for receiving information relating to a geographic destination;
means for determining a geographic location of a personal navigation device based at least in part on received Global Positioning System (GPS) satellite vehicle signals;
means for determining a route from the geographic location to the geographic destination;
means for determining candidate radio frequencies based on the geographic location;
means for ranking the candidate radio frequencies;
means for providing a list of available output radio frequencies based on the ranking of the candidate frequencies to a user; and
means for receiving a user selection of an output RF frequency based on the list of available output radio frequencies;
means for generating an audio signal based on the geographic location and the route;
means for frequency modulating the audio signal onto the output RF frequency to generate a frequency modulated output RF frequency; and
means for outputting the frequency modulated output RF frequency;
means for monitoring signal quality on the output RF frequency; and
means for determining an alternative set of candidate frequencies and for providing a list of alternative output frequencies based on the alternative set of candidate frequencies to the user in response to the signal quality on the output RF frequency falling below a predetermined threshold.

30. A computer readable medium encoded with computer executable instructions for:
receiving information relating to a geographic destination;
determining a geographic location of a personal navigation device based at least in part on received Global Positioning System (GPS) satellite vehicle signals;
determining a route from the geographic location to the geographic destination;
determining candidate radio frequencies based on the geographic location;
ranking the candidate radio frequencies;
providing a list of available output radio frequencies based on the ranking of the candidate frequencies to a user; and
receiving a user selection of an output RF frequency based on the list of available output frequencies;
generating an audio signal based on the geographic location and the route;
controlling a modulator to frequency modulate the audio signal onto the output RF frequency to generate a frequency modulated output RF frequency; and
controlling a transmitter configured to output the frequency modulated output RF frequency;
monitoring signal quality on the output RF frequency;
in response to the signal quality on the output RF frequency falling below a predetermined threshold,
determining an alternative set of candidate frequencies; and
providing a list of alternative output frequencies based on the alternative set of candidate frequencies to the user.

* * * * *